Figure 4:
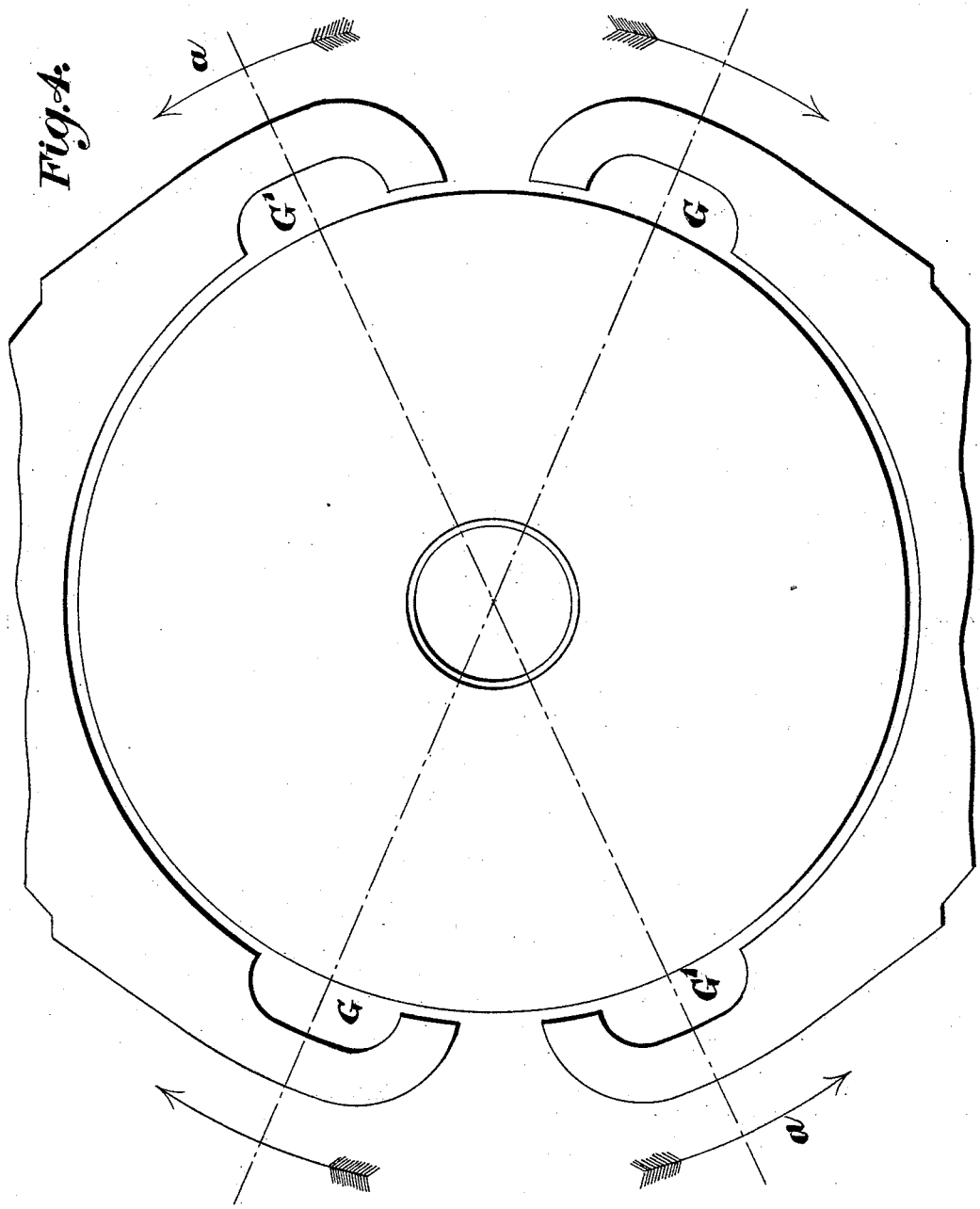

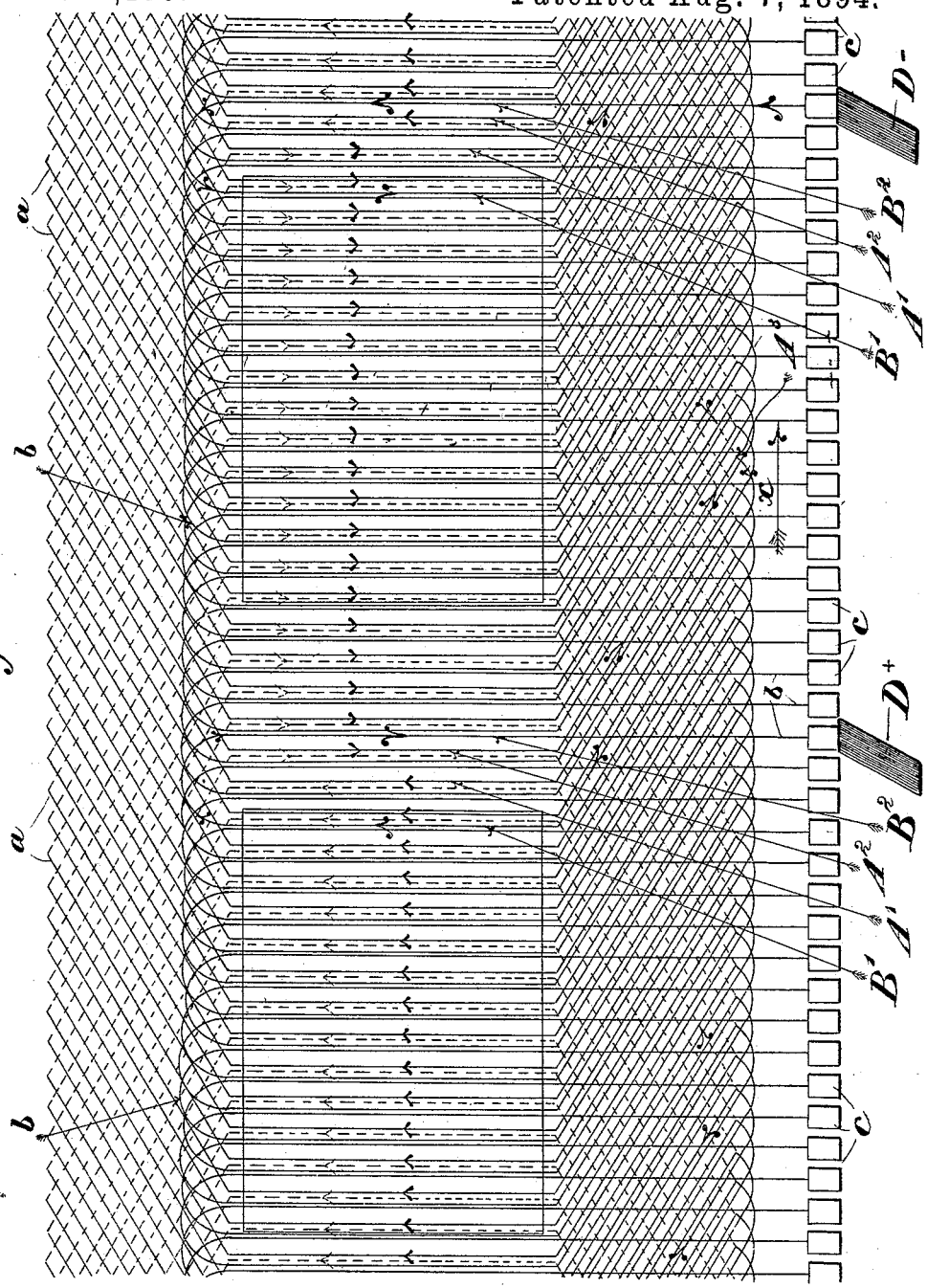

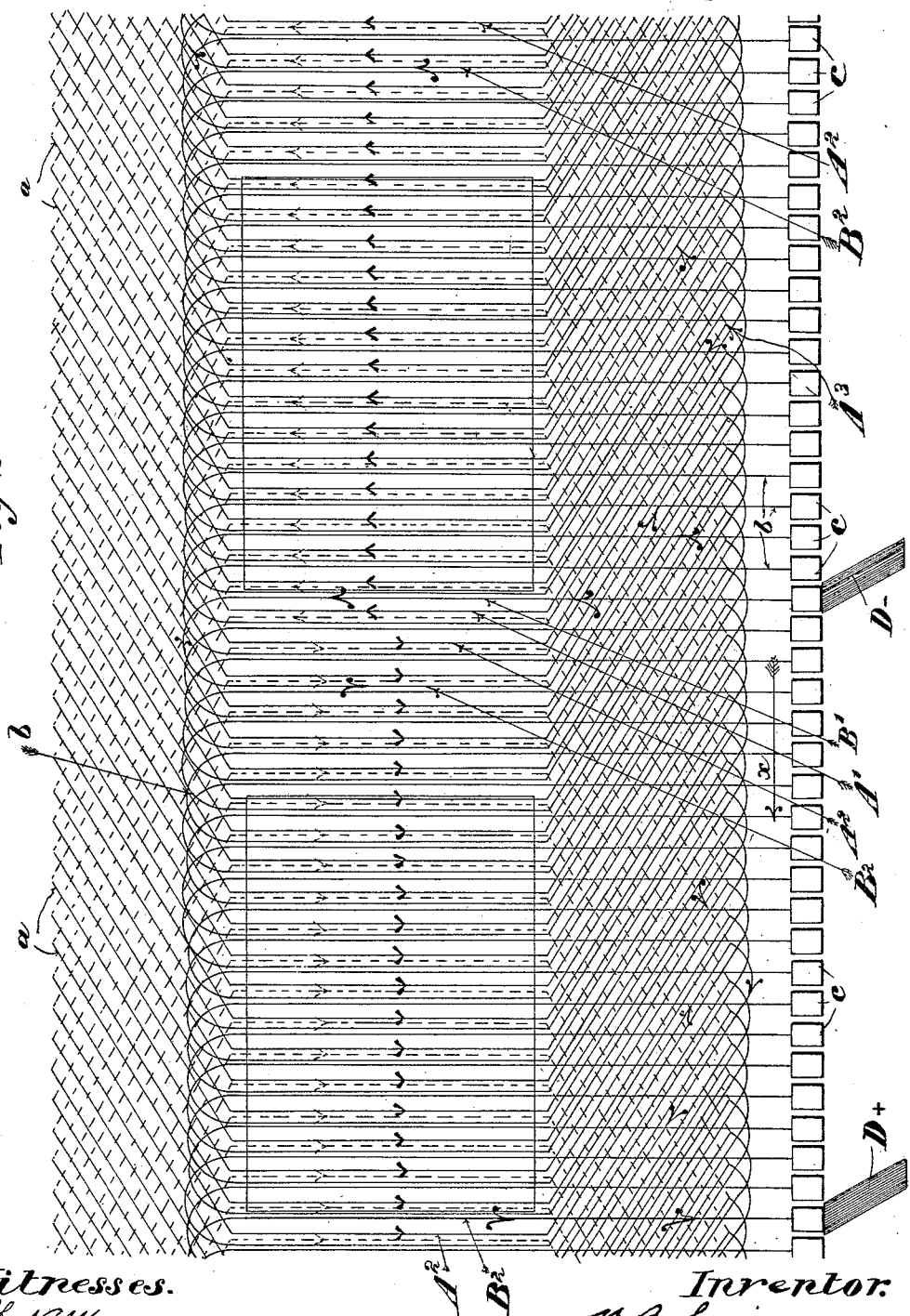

(No Model.) 6 Sheets—Sheet 3.
W. B. SAYERS.
DYNAMO ELECTRIC MACHINE.
No. 524,119. Patented Aug. 7, 1894.
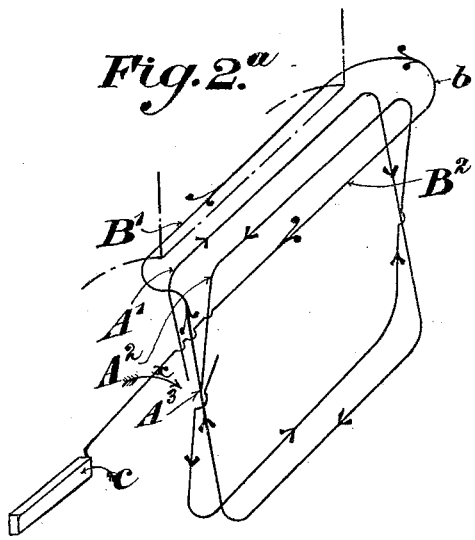
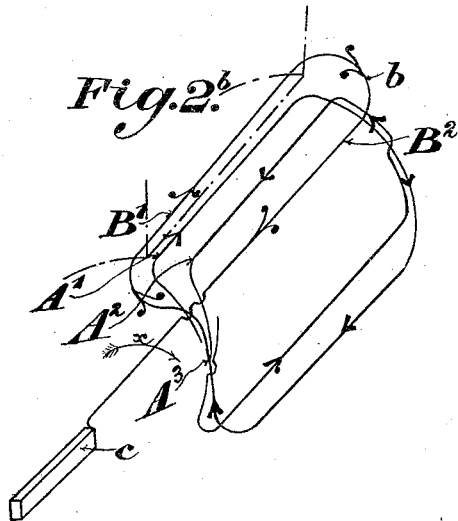
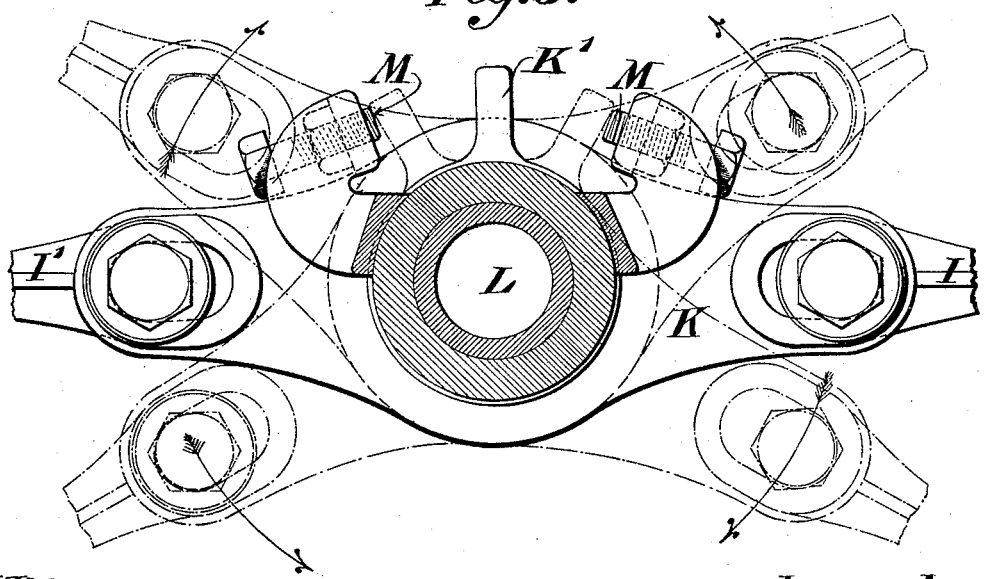

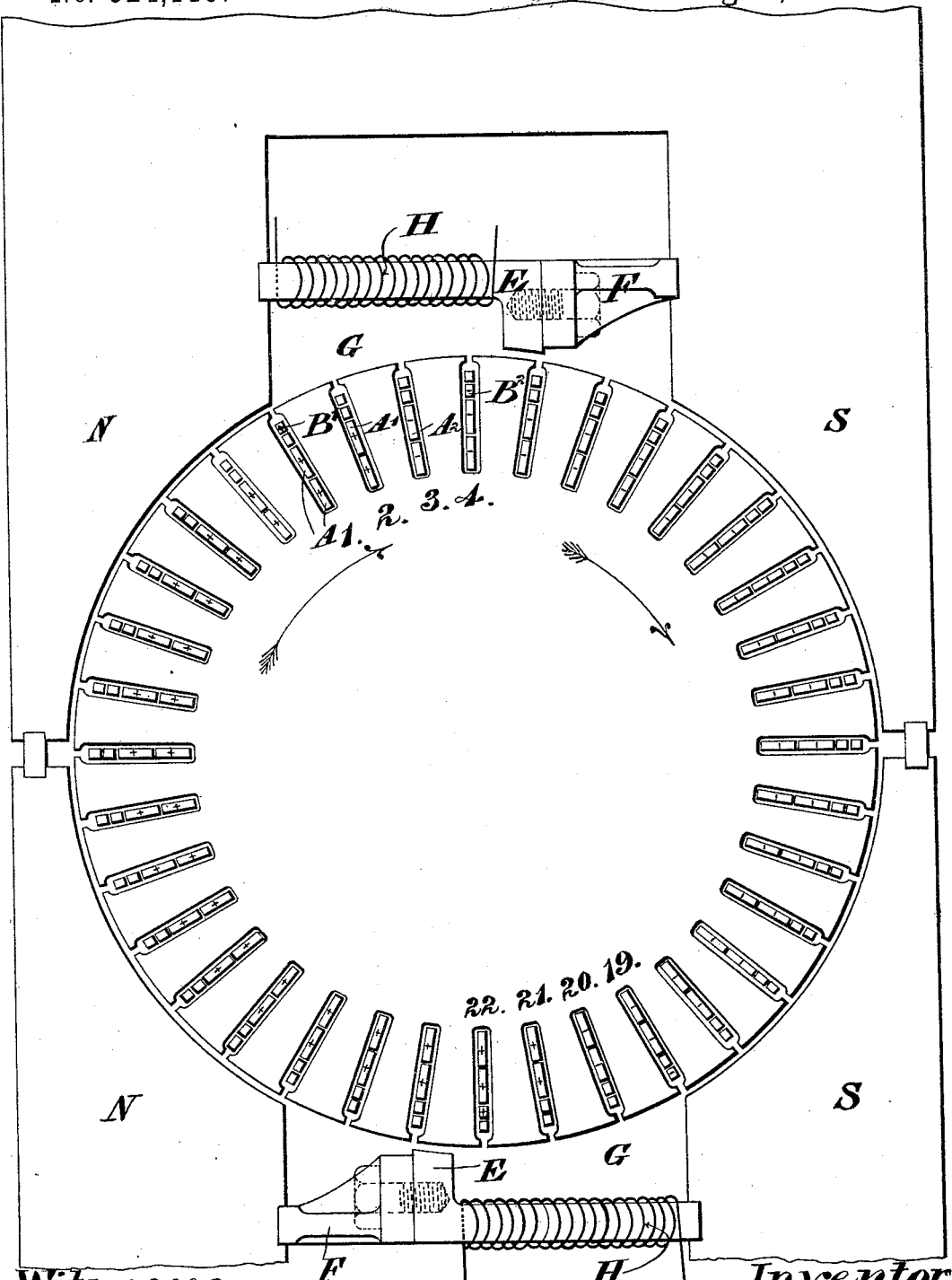

(No Model.) 6 Sheets—Sheet 5.
W. B. SAYERS.
DYNAMO ELECTRIC MACHINE.

No. 524,119. Patented Aug. 7, 1894.

Witnesses.
Hugh McColl
A. Boag

Inventor:
W B Sayers (No Model.)  6 Sheets—Sheet 6.
W. B. SAYERS.
DYNAMO ELECTRIC MACHINE.
No. 524,119. Patented Aug. 7, 1894.

Witnesses.
Hugh McColl
A. Boag.

Inventor.
W B Sayers

UNITED STATES PATENT OFFICE.

WILLIAM BROOKS SAYERS, OF GLASGOW, SCOTLAND.

DYNAMO-ELECTRIC MACHINE.

SPECIFICATION forming part of Letters Patent No. 524,119, dated August 7, 1894.

Application filed January 6, 1894. Serial No. 496,012. (No model.)

*To all whom it may concern:*

Be it known that I, WILLIAM BROOKS SAYERS, a subject of the Queen of Great Britain and Ireland, residing at Glasgow, in the county of Lanark, Scotland, have invented Improvements in Dynamo-Electric Machines, of which the following is a specification.

In the specification of another application for Letters Patent filed by me, dated April 26, 1892, Serial No. 430,707, I have described a construction of dynamo electric machine in which the commutator strips are connected to the sections of the armature winding through commutator coils in which an electro-motive force is set up when the machine is running, the said coils being connected to the armature winding in such a manner that each coil will have a backward lead with reference to the point between sections of the armature winding to which it is connected when the machine is running as a generator, and a forward lead when the machine is running as a motor, and the commutator brushes being so arranged as to have a backward lead when the machine is running as a generator and a forward lead when it is running as a motor, the arrangement in each case being such that the armature current will tend to increase the total magnetic flux, and that the resultant electro-motive force induced in any two of the commutator coils and in the section of the armature winding that connects them, will reverse or tend to reverse the current in the said section of the armature winding, and reduce to zero, the current in the commutator coil connected to the commutator strip that is about to leave the commutator brush at the time when one of the said two commutator coils is under that horn of the field magnet pole which is strengthened by the armature current, and the other has passed from under the same, and the two corresponding strips of the commutator are connected by a commutator brush.

Now my present invention has reference to further developments in dynamo electric machines constructed and operating in the manner referred to, whereby, in addition to other advantages hereinafter mentioned, such a machine can be run in either direction, either as a generator or as a motor, without the necessity of providing it for this purpose with two commutators as described in my said former specification.

Figure 5:
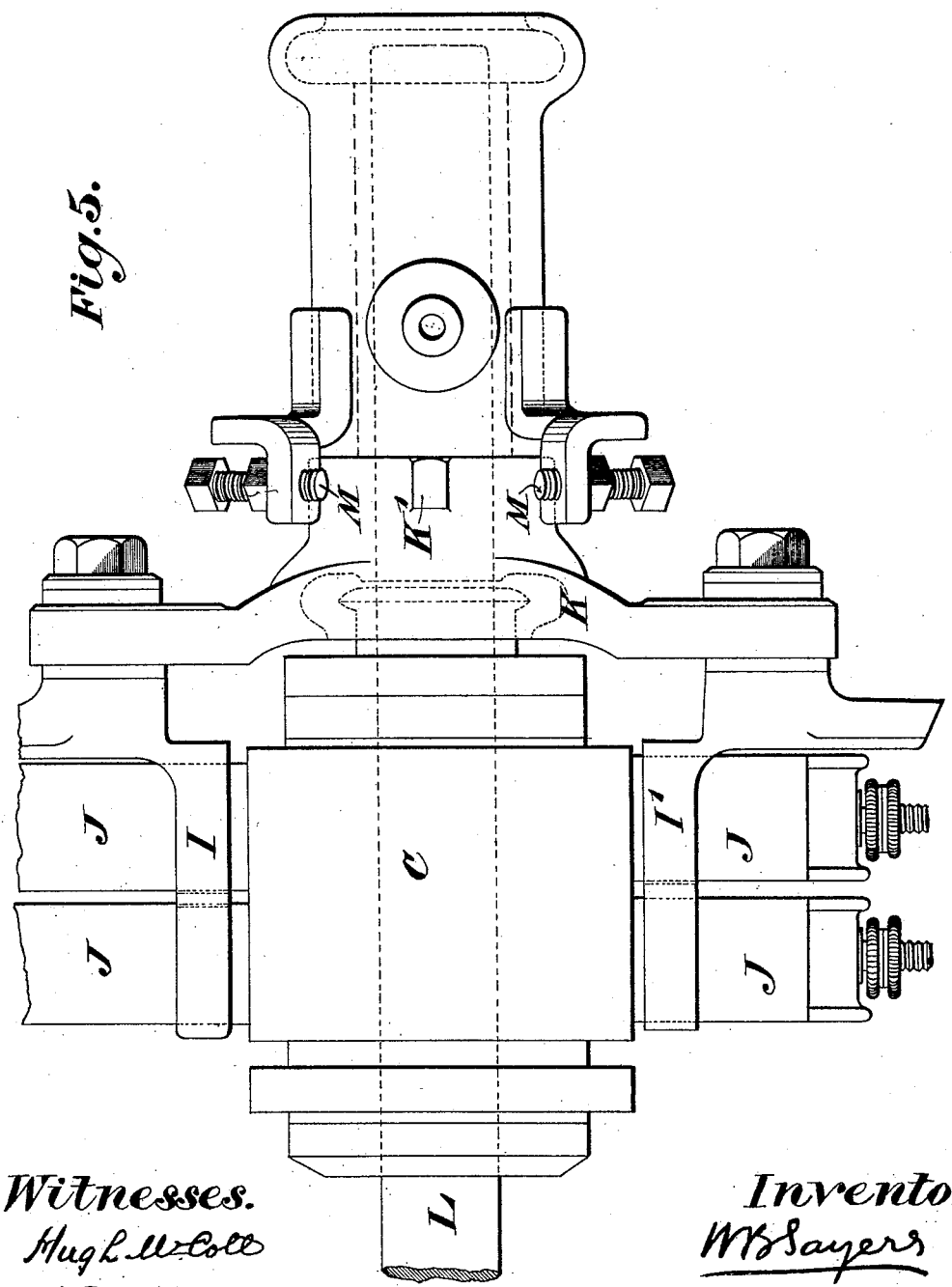

In the accompanying drawings, Figure 1 represents diagrammatically my invention applied to a drum armature winding which is shown as spread out flat or developed so that if the diagram were cut out and formed into a cylinder it would correctly represent the armature winding and commutator coils; the said figure also represents the position of the polar surfaces of the field magnets, the commutator segments, and the commutator brushes when the machine is running as a generator in the direction of the arrow $x$. Fig. 2 is a similar view to Fig. 1, but with the commutator brushes set for running in the opposite direction. Figs. $2^a$ and $2^b$ are further diagrams illustrating the relative arrangement of the armature sections and commutator coils. Fig. 3 is an end elevation illustrating diagrammatically one mode of arranging on the field magnet, certain polar projections, hereinafter referred to. Fig. 4 is an end elevation showing polar projections on each of the horns of the field magnets, the arrangement being suitable for a reversible motor. Fig. 5 is a side elevation, and Fig. 6 an end elevation, partly in cross section, illustrating a construction of rocker and brush-holder according to this invention.

Referring to Figs. 1 and 2:—$a$ $a$ represent the main armature winding, $b$ $b$ the commutator coils, $c$ $c$ the commutator segments, and $D^+$, $D^-$ the commutator brushes.

According to my present invention instead of winding the commutator coils $b$ $b$ around the core of the armature ring or drum, as in the arrangements described in my said former specification, I arrange the said commutator coils longitudinally upon or within the periphery of the armature and so that the longitudinal or side portions $B'$ $B^2$ of the convolutions of each of them will, as shown along the middle portion of Figs. 1 and 2, be located on opposite sides of two sections $A'$ $A^2$ of the armature winding $a$ and be connected at one end to a point $A^3$ of the main armature conductor connecting the said two sections, the arrangement being such that as each commutator coil passes under the tip or horn of a field magnet pole, the portion of the coil which is in front of the said armature sections will have passed out from under said tip or horn and will therefore be inoperative, while the portion which is behind the said armature sections, will be under the pole tip, and therefore operative in producing the resultant electro-motive force required to bring about the reversal, in the manner described in my said former specification, of the section A' located between the said point of connection $A^3$ and the side B' of the commutator coil $b$, that is behind the said point of connection with reference to the direction of rotation, when the machine is running as a generator. It will thus be evident that in whichever direction the machine is running (considering it as a generator) that portion only of the coil will be effectively operative that is behind the armature sections relatively to the direction of rotation, and as one side of the coil is behind when the machine is running in one direction, and the other side when the machine is running in the opposite direction, the arrangement becomes reversible.

When the machine is used as a motor, the foregoing reasoning holds except that it is the portion of the commutator coil which is in front of the armature sections, relatively to the direction of rotation, which is operative, and the portion which is behind which is inoperative, in whichever direction the machine may be running.

The portions of the main winding $a$ shown dotted are supposed to be directly beneath the portion shown full, and the two portions B' $B^2$ of the commutator coils $b$ are supposed to be lying over the main winding, but these relations are not essential. The small arrow heads in full and broken lines represent the direction of the current in the respective portions of the main winding, and the large arrow heads represent the direction of the current in the commutator coils which are connected to the commutator segments that are for the time being, under the brushes. It will be seen that in each case the current in the commutator coils is in the same direction as in the adjacent portions of the main winding $a$ and that at the instant depicted in the diagram, when a commutator segment $c$ is midway under each brush, the two portions of the commutator coil that is, for the time being, active, are symmetrically placed with reference to the portions of the winding in which the reversal of direction of current takes place.

The commutator coils $b$ may advantageously be each so arranged that the long side portions of the two armature sections A' $A^2$ (to a point $A^3$ on the armature conductor connecting which one end of the commutator coil is connected) will be located symmetrically between the side portions B' $B^2$ of the said commutator coil, so that the said side portions of the latter coil will have an equal lead relatively to the side portion of that one of the two armature sections concerned which is nearest to it, and which is about to be reversed, in whichever direction the armature may rotate. This will be seen from Figs. $2^a$ and $2^b$ which show two sections A' $A^2$ of a drum armature winding with the corresponding commutator coil $b$ the two side portions B' $B^2$ of which are located on opposite sides of the said sections and which are connected at the point $A^3$ to a part of the drum winding connecting the said two sections. Fig. $2^a$ shows diagrammatically how the sections and coil would be arranged if it were not for the space occupied by the shaft and the crossing of the other wires. The actual arrangement is more like Fig. $2^b$. In each case, if the armature be rotating in the direction of the arrow $x$ it is the armature section A' which is about to be reversed, the section $A^2$ having just been reversed; while if the armature be rotated in the opposite direction, it would be the section $A^2$ which would be about to be reversed, section A' having just undergone reversal. Thus the necessary condition for complete reversibility is that section A' should be related to the side B' of the commutator coil in exactly the same way as section $A^2$ is related to the side $B^2$ of the said commutator coil. As will also be seen from Figs. $2^a$ $2^b$, the plane containing the commutator coil is approximately at right angles to those containing the armature sections A' $A^2$.

In order to make the improved commutator coils $b$ hereinbefore described more powerfully operative for the purpose in view, I sometimes construct the tips or horns of the field magnet pole pieces (or keepers as they may be called when there is no winding upon them) with recesses G (Figs. 3 and 4) on the side next the armature, the width of each recess being made approximately equal to the distance between the two longitudinal or side portions of each commutator coil. The magnetic density in the recess will be small compared with that between the armature and polar surface at each side thereof. The result of this construction, in the case of a generator, is that the portion of a commutator coil which is in front of the armature section to which it is connected, and also such armature section, will be opposite the recess at the time when the portion of the commutator coil which is behind the said armature section will be still in the part where the magnetic density is greatest. An electro-motive force will therefore be induced in the commutator coil the direction of which (determined by the relative directions of winding of the main armature coils and the commutator coils) should be such as to cause the armature current to flow through this commutator coil to the brush. When the commutator coil reaches the position in which its two sides coincide approximately with the edges of the said recess G, the electromotive forces induced in the two sides of the coil will be equal and opposite. When the portion of the commutator coil which is in front of the said armature section has passed from the recess and into a position under the pole tip where the magnetic flux is denser, the portion of the coil which is behind will have passed into a position opposite the recess and consequently a resultant electromotive force will now be generated in the coil opposite in direction to that under the conditions first considered. It will now be evident that if the commutator brushes D are set so as to correspond with the position of the recesses, then of the two commutator coils which surround the sides of an armature section concerned at the moment when two commutator bars are connected under the brush, that commutator coil which last became connected under the brush, will have a resultant electromotive force induced in it in such a direction as to cause the armature current to flow through this commutator coil to the brush, while the other commutator coil which, (of the two being considered) first became connected with the brush, will have a resultant electromotive force induced in it tending to stop the current flowing through it from the armature. The result of these conditions is to bring about the reversal of the armature section—at the ends of which are connected the two commutator coils—during the time in which the corresponding commutator bars or segments C are passing under the brush.

In the construction shown in Fig. 3 the recesses G in the pole tips or horns are each formed by fitting a bi-metallic bridge in between the magnet poles N. S. The portion of each bridge marked E is of iron and when in position forms an extension of that pole with which it is in contact and so as to form with such pole the recess G. The portion of each bridge marked F is of brass or other non-magnetic material. The two bridges are arranged to form extensions of the upper pole N and the lower pole S as shown when the machine is running as a generator in the direction of the arrow, and also when running in the contrary direction as a motor. If it be desired, in either case, to run the machine in the opposite direction, the two bridges are slid out endwise and turned end for end and replaced, after which the machine may be run in the contrary direction. In the said Fig. 3, the sign + is intended to indicate an advancing current toward the end of the armature shown, and the sign — a receding current. A tunnel armature is indicated in Fig. 3, the two conductors at the bottom or inner end of the slots belonging to the main armature winding A, and those at the top or outer end to the commutator coils B. Each recess G is approximately equal in width to the distance between the two portions of the commutator coil B that lies in slots 1 and 4 and is connected at one end to the point between the two main winding sections which lie in slots 2 and 3.

In some cases I may wind insulated wire in the recesses formed in the polar horns and over the outside of same, and connect up the coils so formed, either in shunt or series, or in both shunt and series, in order to control the magnetic flux through the projecting horn or pole extension.

In Fig. 3, H H represent windings upon the polar extensions E E. These windings may either form a shunt circuit independently of the shunt coils on the main magnets, or they may be connected in series with the latter coils. The direction of winding is such as to reduce the number of lines of force passing through these extensions to such an extent as to be only just sufficient to prevent sparking when the machine is lightly loaded.

When the load on the machine is increased, the armature reaction or cross induction, causes an increase in the number of such lines of force approximately proportional to the load, the effect of which is to tend to obviate the necessity for moving the brushes upon the commutator when the load is varied.

When the machine is required to run in either direction at will, recesses G G' such as described are formed, in all the polar horns the brushes being set so as to correspond with those which are strengthened by the armature current. Thus in Fig. 4, which illustrates a construction suitable for a reversible motor, if the armature rotates in the direction of the pair of arrows marked $a$, then the recesses G' directly opposite the arrows will be employed, and the commutator brushes set so as to connect with the commutator segments joined to the commutator coils whose sides lie opposite the edges of the said recesses. With this arrangement of commutator coils herein described, the effect of the current in the commutator coils is rather to increase the magnetic flux through the armature core whereas in the arrangement described in my said former specification, the action of the current in the commutator coils was to cancel part of the advantageous magnetizing effect of the armature current obtained when the brushes are set with a backward lead. Furthermore by the arrangement described, the necessity of carrying the commutator coils over the ends of drum armatures, or through the center of ring armatures, is avoided, thereby saving wire and space, reducing the electrical resistance of the said coils and enabling the armature to be constructed in a more practical and neat manner than would otherwise be the case. Also by the use of the polar projections H or recesses G practically the same useful effect, for the purpose specified, can be obtained as if the commutator coils passed around the armature and were operated upon by both pole tips.

Dynamo electric machines of the improved construction hereinbefore described, when used as motors, may advantageously be provided with brush holders I as shown in Figs. 5 and 6 carrying radial commutator brushes J carried by a rocking arm or lever K that is provided with a projection K' and is mounted so as to be free to turn on the armature shaft L through an arc limited by adjustable stops M, the arrangement being such that assuming the armature to have been running in one direction with the brushes arranged with a forward lead, and that the direction of motion of the armature is reversed by changing the relative directions of current in the armature and field magnet, the brush holder I, carrying the brushes will, by reason of the friction between the brushes and commutator C', be automatically caused to move through the arc so as to give the said brushes a forward lead in the new direction of rotation, as indicated by the arrows and dotted lines in Fig. 6.

What I claim is—

1. An armature for a dynamo electric machine in which the sections of the armature winding are connected to the commutator sections by commutator coils portions of each of which are located on opposite sides of a section of the said winding to one end of which said commutator coil is connected.

2. In a dynamo electric machine, an armature having the sections of its winding connected to the commutator strips by commutator coils arranged longitudinally upon or within the periphery of the armature and so that portions of the convolutions of each of them will be located on opposite sides of two sections of said winding to the portion of the main armature conductor uniting which said commutator coil is connected.

3. A dynamo electric machine in which the sections of the armature winding are connected to the commutator strips by commutator coils each of which is so arranged that the sides of the two sections of the armature to a point on the conductor uniting which the said coil is connected, are located symmetrically between the longitudinal or side portions of the said coils so that such portions will have an equal lead relatively to the armature section which is to be reversed, in whichever direction the armature rotates.

4. A dynamo electric machine in which the sections of the armature winding are connected to the commutator strips by commutator coils each of which is arranged approximately at right angles to the plane of the armature sections to which it is connected.

5. A dynamo electric machine having an armature in which the sections of the armature winding are connected to the commutator sections by commutator coils, and field magnet pole pieces or keepers the tips or horns of which are formed with recesses on the side next the armature for the purpose specified.

6. A dynamo electric machine having an armature in which the sections of the armature winding are connected to the commutator sections by commutator coils portions of the convolutions of each of which are located on opposite sides of two sections of the armature winding to the junction or conductor uniting which said commutator coil is connected, and field magnet pole pieces or keepers the tips or horns of which are provided with recesses on the side next the armature of a width equal or approximately so to the distance between the two longitudinal or side portions of each of said commutator coils.

7. In a dynamo electric machine the combination with an armature having its winding connected to the commutator sections by commutator coils, of field magnet pole pieces or keepers provided with polar extensions adapted to form recesses with said pole pieces or keepers, substantially as herein described for the purpose specified.

8. In a dynamo electric machine, the combination with an armature having its winding connected to the commutator sections by commutator coils, of field magnet pole pieces or keepers provided with polar extensions adapted to form recesses with said pole pieces or keepers and each provided with a winding through which an electric current can be caused to pass substantially as herein described for the purpose specified.

9. In a dynamo electric machine, the combination with an armature having its winding connected to the commutator sections by commutator coils, of field magnet pole pieces or keepers provided with reversible polar extensions adapted to form recesses with the pole pieces or keepers with which for the time being they are in contact substantially as herein described for the purpose specified.

10. In a dynamo electric machine, the combination with an armature having its winding connected to the commutator sections by commutator coils, of field magnet pole pieces or keepers provided with reversible bridge pieces removably secured between pairs of said pole pieces and each formed partly of magnetic and partly of non-magnetic material, the magnetic portion being arranged to form a recess with the pole piece with which it is in magnetic connection substantially as herein described for the purpose specified.

11. In a dynamo electric machine, the combination with an armature having its winding connected to the commutator sections by commutator coils, of brush holders adapted to carry radial brushes and mounted so as to be free to be turned through an arc of limited length by the friction between the said brushes and the commutator upon reversal of motion of said armature substantially as herein described for the purpose specified.

In testimony whereof I have signed my name to this specification in the presence of two subscribing witnesses.

WILLIAM BROOKS SAYERS.

Witnesses:
 CHARLES FREDERICK POLLOCK FRASER,
 GEORGE MORTON MCNAUGHT,
*Clerks at Law*, 160 *West George Street, Glasgow.*